(12) United States Patent  (10) Patent No.: US 8,128,493 B2
Willis et al.  (45) Date of Patent: Mar. 6, 2012

(54) METHOD AND SYSTEM FOR AUTOMATICALLY MANAGING A CONTENT APPROVAL PROCESS FOR USE IN IN-GAME ADVERTISING

(75) Inventors: Daniel Willis, Stittsville (CA); Dhananjay Godse, Kanata (CA)

(73) Assignee: Google Inc., Mountain View, CA (US)

( * ) Notice: Subject to any disclaimer, the term of this patent is extended or adjusted under 35 U.S.C. 154(b) by 353 days.

(21) Appl. No.: 11/311,124

(22) Filed: Dec. 20, 2005

(65) Prior Publication Data

US 2006/0135235 A1 Jun. 22, 2006

Related U.S. Application Data

(60) Provisional application No. 60/636,878, filed on Dec. 20, 2004.

(51) Int. Cl.
*A63F 13/00* (2006.01)
(52) U.S. Cl. .............................. 463/31; 463/42
(58) Field of Classification Search ................ 463/1, 42, 463/31; 700/90, 91
See application file for complete search history.

(56) References Cited

U.S. PATENT DOCUMENTS

| 5,724,424 A | 3/1998 | Gifford |
| 5,740,549 A | 4/1998 | Reilly et al. |
| 5,768,382 A | 6/1998 | Schneier et al. |
| 5,816,918 A | 10/1998 | Kelly et al. |
| 5,823,879 A | 10/1998 | Goldberg et al. |
| 5,941,772 A | 8/1999 | Paige |
| 5,946,664 A | 8/1999 | Ebisawa |
| 6,036,601 A * | 3/2000 | Heckel ............................. 463/42 |
| 6,186,893 B1 * | 2/2001 | Walker et al. .................... 463/20 |
| 6,196,920 B1 | 3/2001 | Spaur et al. |
| 6,253,189 B1 | 6/2001 | Feezell et al. |
| 6,285,985 B1 | 9/2001 | Horstmann |
| 6,390,917 B1 * | 5/2002 | Walker et al. .................... 463/20 |
| 6,430,301 B1 | 8/2002 | Petrovic |
| 6,442,259 B2 | 8/2002 | Culli et al. |
| 6,513,052 B1 * | 1/2003 | Binder .......................... 707/204 |
| 6,616,533 B1 * | 9/2003 | Rashkovskiy .................. 463/31 |
| 6,625,578 B2 * | 9/2003 | Spaur et al. ..................... 705/14 |
| 6,640,336 B1 | 10/2003 | Ebisawa |
| 6,704,415 B1 | 3/2004 | Katayama et al. |
| 6,769,002 B2 * | 7/2004 | Ayan .......................... 707/104.1 |
| 6,882,978 B2 | 4/2005 | Ebisawa |
| 6,890,256 B2 * | 5/2005 | Walker et al. .................... 463/20 |
| 6,928,414 B1 | 8/2005 | Kim |
| 7,085,733 B2 | 8/2006 | Ebisawa |
| 7,089,195 B2 | 8/2006 | Rosenberg |
| 7,094,149 B2 * | 8/2006 | Walker et al. .................... 463/25 |

(Continued)

FOREIGN PATENT DOCUMENTS

EP 1 087 312 A2 3/2001

*Primary Examiner* — Masud Ahmed
(74) *Attorney, Agent, or Firm* — Fish & Richardson P.C.

(57) ABSTRACT

A method for approving data wherein a request for approval of advertising content for being impressed upon video game players within a known advertising spot within a known video game is provided. Based on the advertising spot and the video game a system determines at least a party for approving of the advertising content. Then, the system automatically transmits a message to the at least a party requesting their approval of the advertising content for being impressed upon video game players within the known advertising spot within the known video game.

47 Claims, 9 Drawing Sheets

U.S. PATENT DOCUMENTS

| | | |
|---|---|---|
| 7,136,871 B2 | 11/2006 | Ozer et al. |
| 7,249,383 B1 | 7/2007 | McCully et al. |
| 7,452,278 B2 | 11/2008 | Chen et al. |
| 2001/0010059 A1 | 7/2001 | Burman et al. |
| 2002/0004743 A1 | 1/2002 | Kutaragi et al. |
| 2002/0055880 A1* | 5/2002 | Unold et al. .................... 705/26 |
| 2002/0059148 A1 | 5/2002 | Rosenhaft et al. |
| 2002/0059272 A1 | 5/2002 | Porter |
| 2002/0072413 A1 | 6/2002 | Arias et al. |
| 2002/0082910 A1 | 6/2002 | Kontogouris |
| 2002/0095675 A1 | 7/2002 | Lowthert et al. |
| 2002/0116263 A1 | 8/2002 | Gouge |
| 2002/0120589 A1 | 8/2002 | Aoki |
| 2002/0161648 A1 | 10/2002 | Mason et al. |
| 2003/0063750 A1 | 4/2003 | Medvinsky et al. |
| 2003/0101454 A1 | 5/2003 | Ozer et al. |
| 2003/0135415 A1* | 7/2003 | Nakamura ..................... 705/14 |
| 2003/0177187 A1 | 9/2003 | Levine et al. |
| 2004/0015608 A1* | 1/2004 | Ellis et al. .................... 709/246 |
| 2004/0043806 A1 | 3/2004 | Kirby et al. |
| 2004/0044999 A1 | 3/2004 | Gibson |
| 2004/0073909 A1 | 4/2004 | Airmilli et al. |
| 2004/0116183 A1 | 6/2004 | Prindle |
| 2004/0128364 A1 | 7/2004 | Clark |
| 2004/0143852 A1 | 7/2004 | Meyers |
| 2004/0148221 A1* | 7/2004 | Chu ............................... 705/14 |
| 2004/0163107 A1* | 8/2004 | Crystal .......................... 725/32 |
| 2004/0221178 A1 | 11/2004 | Aaron et al. |
| 2005/0033700 A1 | 2/2005 | Vogler et al. |
| 2005/0098955 A1 | 5/2005 | Rasmussen |
| 2005/0137013 A1* | 6/2005 | Parsadaian ..................... 463/42 |
| 2005/0137015 A1 | 6/2005 | Rogers et al. |
| 2005/0222902 A1* | 10/2005 | Coit et al. ....................... 705/14 |
| 2005/0228797 A1* | 10/2005 | Koningstein et al. ......... 707/100 |
| 2005/0246638 A1 | 11/2005 | Whitten |
| 2005/0255923 A1 | 11/2005 | Aoki |
| 2006/0004628 A1 | 1/2006 | Axe et al. |
| 2006/0069614 A1* | 3/2006 | Agarwal et al. ................ 705/14 |
| 2006/0129451 A1* | 6/2006 | Kohanim et al. ............... 705/14 |
| 2006/0135233 A1 | 6/2006 | Willis et al. |
| 2006/0148573 A1 | 7/2006 | Willis et al. |
| 2006/0166742 A1 | 7/2006 | Willis et al. |
| 2007/0043616 A1 | 2/2007 | Kutaragi et al. |
| 2008/0102947 A1 | 5/2008 | Hays et al. |

* cited by examiner

METHOD AND SYSTEM FOR AUTOMATICALLY MANAGING A CONTENT APPROVAL PROCESS FOR USE IN IN-GAME ADVERTISING

REFERENCE TO THE PRIOR APPLICATION

This application claims benefit from U.S. Provisional Application No. 60/636,878 filed Dec. 20, 2004, the entire contents of which is incorporated herein by reference.

FIELD OF THE INVENTION

The invention relates to in-game advertising and more particularly to a method of approving in-game advertising content.

BACKGROUND OF THE INVENTION

During recent years, computer gaming has gained increasing popularity, and today thousands of players are playing games all around the world. Predictably, interactive computer gaming has blurred the line between games and other entertainment or communication media, and the avenues that are being explored in the development of gaming might well break new ground for interactive Internet applications in all areas of business relations and social life.

Due to their dynamic nature and specific appeal to certain audiences, computer games and especially games played on Internet enabled platforms provide the ideal vehicle for Internet advertising. Not only is it possible for an advertiser to target directly a specific group of customers, but also advertisements can be directly incorporated into the computer games, enabling something akin to the well-known concept of product placement. In such a system, a game is running on a system that is connected to the Internet. Throughout the playing of the game, the game software contacts a set of ad servers to retrieve advertising content to present to the user during game play. The data and advertising content is transferred using HTTP protocols over the Internet. Optionally, the advertising content is cached locally to the game, and throughout the playing of the game the game software contacts a set of ad servers to retrieve a list of advertising content to present to the user during game play.

For product placement advertisements, there is a considerable development effort involved in their implementation and a considerable business effort in sales, customer service, and reporting. As such and because of the constant communication, each party involved in the advertisement design, placement, and integration is provided an opportunity to present input opinions and decisions. With all of this communication, advertisements are approved by each party as part of their involvement. From the game developer, to the game producer, to the advertiser, to the game console manufacturer, to third party IP holders each party sees and approves of the content through their business dealings. Clearly, for one or two advertisements built into a video game, this is manageable.

With the advent of dynamic in-game advertising, there is significantly more effort in garnering approval for advertising content and yet, companies involved in in-game advertising continue to pursue manual approvals in order to ensure that all parties approve of advertising content for a video game. Such a process is slow, costly, and prone to human error, where the error is often uncorrelated to the parties involved—one party makes an error that adversely affects another party. This is very undesirable.

Of course, one of the great problems that in-game advertising is to face is that for a single product placement, relatively senior people within an organization involve themselves in the process. For 1000 advertisements, the hands on executive is no longer feasible. Unfortunately, with more advertisements and fewer senior level people involved, a recipe for disaster results.

It would be advantageous to provide a method and system that overcomes these and other drawbacks of the prior art.

It is an object of the invention to provide an enhanced content approval process for use with in-game advertising.

In accordance with the invention there is provided a method comprising: providing a request for approval of advertising content for being impressed upon video game players within a known advertising spot within a known video game; determining based on the advertising spot and the video game at least a party for approving of the advertising content; and automatically transmitting a message to the at least a party requesting their approval of the advertising content for being impressed upon video game players within the known advertising spot within the known video game.

In accordance with the invention there is provided a method comprising: receiving secured advertising content from a remote server, the advertising content secured against tampering; determining from the secured advertising content an approval status thereof; determining based on the secured advertising content an absence of tampering thereof; and, when the secured advertising content is both approved and absent tampering, storing of the advertising content in an accessible form within a memory storage for retrieval during video game execution and for impressing upon a gamer of the video game.

In accordance with another aspect of the invention there is provided a system comprising: a suitably programmed processor for: providing a request for approval of advertising content for being impressed upon video game players within a known advertising spot within a known video game; determining based on the advertising spot and the video game at least a party for approving of the advertising content; and automatically transmitting a message to the at least a party requesting their approval of the advertising content for being impressed upon video game players within the known advertising spot within the known video game.

In accordance with another embodiment of the invention there is provided a system comprising: a suitably programmed processor for: wherein secured advertising content is received at a video game system; wherein software in execution on the video game system determines from the secured advertising content an approval status thereof; wherein software in execution on the video game system determines based on the secured advertising content an absence of tampering thereof; and, wherein storing of the advertising content comprises storing of the advertising content in an accessible form within a memory storage of the video game system for retrieval during video game execution and for impressing upon a gamer of the video game.

In accordance with another aspect of the invention there is provided a storage medium having data stored therein, the data for when executed resulting in performance of: providing a request for approval of advertising content for being impressed upon video game players within a known advertising spot within a known video game; determining based on the advertising spot and the video game at least a party for approving of the advertising content; and automatically transmitting a message to the at least a party requesting their approval of the advertising content for being impressed upon video game players within the known advertising spot within the known video game.

In accordance with another embodiment of the invention there is provided a storage medium having data stored therein, the data for when executed resulting in performance of: a suitably programmed processor for: wherein secured advertising content is received at a video game system; wherein software in execution on the video game system determines from the secured advertising content an approval status thereof; wherein software in execution on the video game system determines based on the secured advertising content an absence of tampering thereof; and, wherein storing of the advertising content comprises storing of the advertising content in an accessible form within a memory storage of the video game system for retrieval during video game execution and for impressing upon a gamer of the video game.

BRIEF DESCRIPTION OF THE DRAWINGS

The invention will now be described in conjunction with the attached drawings in which.

DETAILED DESCRIPTION OF EMBODIMENTS OF THE INVENTION

When an advertisement service provider (ADSP) has access to information relating to a list of video game advertising spots (ad spots), still there is the problem of keeping up with the dynamic number of available advertising spots and their individual approval status. For example, a game provider has the ability to enable any disabled spots within a game thereby changing the number of available spots, and an ADSP optionally enables multiple slots for a single spot, such that the list of advertising spots is changing dynamically. The situation is particularly complex in a wholesaling environment, in which a lease-holding ADSP re-sells unused spots to other ADSPs, etc. Such dynamic changes are exceedingly difficult to track in a manual process, such as through a use of media kits and manual approvals. Furthermore, when the advertiser does not care about specific video game titles and is merely seeking a demographic, then the advertisement service provider addresses a list to aggregate advertising spots of many individual games into a sufficient demographic. Now, the number of approvals is also changing dynamically and spans many different game titles, game publishers and game hardware providers.

Also, advertising content subjected to an approval process ensures that a game provider and other approving parties are comfortable with the look, feel, and messaging associated with the advertising content that is proposed for being displayed within their game. This approval process requires that an advertisement service provider be able to communicate directly, indirectly or otherwise with parties involved in the approval process such as the game provider and the game hardware provider until approval is granted.

Figure 1:
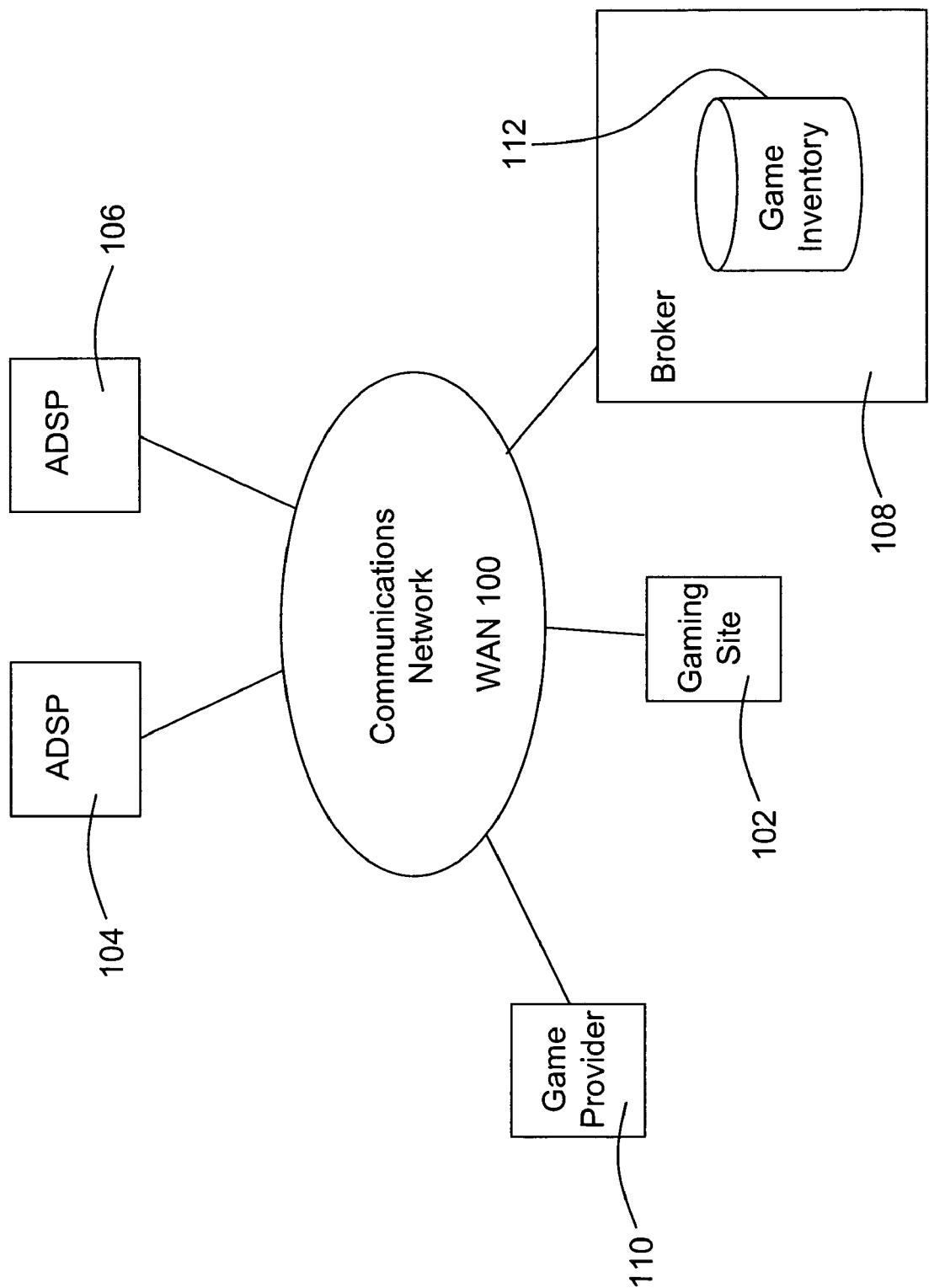
FIG. 1 is a high-level block diagram of a broker mediated advertisable gaming system.

Referring now to FIG. 1, shown is a high-level block diagram of a broker mediated advertisable gaming system. A computer system of gaming site 102 is connected to Internet Protocol Wide Area Network (WAN) 100. Advertising service provider (ADSP) 104 and ADSP 106 also are connected to WAN 100. ADSP 104 and ADSP 106 implement one or more ad campaigns at a time. In the case of plural ad campaigns, ADSP 104 and ADSP 106 each schedule delivery of advertising content that is provided by different advertisers, to a limited number of available spots within instances of a game at gaming site 102. Clearly, it is a complex task managing and scheduling advertising content that is selected from a plurality of different advertising campaigns, which are being implemented by a plurality of ADSPs, for display at spots appearing within instances of a game at gaming site 102. It is also a complex task to manage and schedule approval processes for each the advertising spots and more particularly for each proposed advertisement for insertion within each of the advertising spots. Advertising broker site 108, which also is connected to WAN 100, acts as an intermediary between the plurality of ADSPs and gaming site 102, as described for instance in U.S. Provisional Patent Application No. 60/636,543 filed on Dec. 17, 2004 and in a co-pending United States patent application claiming priority therefrom and filed on Dec. 19, 2005; in U.S. Provisional Application No. 60/636,545 filed on Dec. 17, 2004 and in a co-pending United States patent application claiming priority therefrom and filed on Dec. 19, 2005; and, in U.S. Provisional Patent Application No. 60/636,542 filed on Dec. 17, 2004 and in a co-pending United States patent application claiming priority therefrom, the entire contents of each of which are incorporated herein by reference.

A game provider 110 also is connected to WAN 100. The game provider 110 creates an advertising enabled game. For instance, when in execution on a computer system of gaming site 102, information relevant to advertising is provided via WAN 100 from one or both of ADSP 104 and ADSP 106. Based on the provided information, advertising content is displayed at spots within game instances of the advertising enabled game. The game provider 110 designs spots that differ in terms of suitability for displaying different types of advertising content. For instance a billboard-type spot within a game is suitable for displaying advertising content relating to a wide variety of products and services, whereas product placement-type ads are, by their nature, limited to those types of products appearing at various places throughout the game.

Typically, the game provider 110 registers advertising spots prior to release of the game. For instance, according to an embodiment the game provider 110 uses an interface, such as for instance a graphical user interface, to itemize each spot in the game. The game provider 110 then characterizes the itemized spots, for instance according to media type and/or size that is supported by the spot, and/or a value of the spot. The value of the spot is determined, for instance, by its visibility within the game, by the length of time the spot appears during game play, and/or by the frequency of appearance during game play. In the case of a game that is already in distribution, optionally the value of the spot is updated using statistical data relating to impressions served, billing information, demographic information etc., based on reported actual game play statistics. Optionally the reported actual game play statistics are displayed directly, for instance within a separate frame or within a window of the graphical user interface.

The game provider 110, using the graphical user interface, captures a suitable screen shot that is relevant to each of the itemized spots. Optionally, the game provider 110 places each itemized spot on a map, which is used to navigate quickly to a desired spot. This supports displaying two-dimensional representations of the itemized spot, to which proposed advertising content optionally is added so as to provide a preview of the advertising content within the context of the game. Further optionally, the game provider 110, using the graphical user interface, captures suitable three-dimensional views that are relevant to each of the itemized spots, where desirable. This is accomplished, for instance, by capturing a "video" of the game with an itemized ad spot in it and defining the itemized ad spot in each image within the video, or by capturing a video with an itemized ad spot shown as a "blue" screen for being automatically extracted, or by converting the game content—video segment—into a format for automatically having ad content inserted therein at the itemized ad spot.

The game provider 110 optionally lists conditions or special information relating to the itemized spots. Additionally, the game provider 110 optionally reviews and filters the existing spots, to determine whether financial and game play goals have been met.

According to one implementation, the graphical user interface is exposed as a stand-alone application. In this case, the graphical user interface interacts with the game provider's native game-building application, when one is present, in such a way that one of the graphical user interface and the native game-building application is a "plug-in" or "module" for the other. The graphical user interface application also interacts with a database of ADSP 104 and/or ADSP 106, so as to facilitate creative content extraction and mapping.

The graphical user interface allows a game provider 110 to create a spot by specifying its size and position, for instance with drawing tools on top of a rendered screen, and then automatically generate default properties based on the specified size and location. The game provider 110 then is able to override the defaults or assign additional properties. If the graphical user interface is not tightly integrated with the game-building application, when one is present, then the graphical user interface is able to read the configuration file generated by game developers that are associated with the game provider 110, as it is of value that the catalog be an accurate accounting of the game's spots. Advertising spots optionally are deleted, and/or their properties are modified using the graphical user interface.

Using the graphical user interface to perform the above-mentioned operations results in spot-specific and game-specific information. Advantageously, the spot-specific information optionally is accessible from the game-specific information, for instance as hyperlinks in an image map. All spots that are part of a single plane or cluster optionally are highlighted. Selection of spots optionally is by clicking on an image or map, searching, iterating, etc. The spot-specific and game-specific information is optionally persisted within the game provider's intranet initially, but eventually must be persisted as a catalog by the advertising broker site 108. The list for the advertising enabled game in the preceding discussion is independent of any lease.

When an advertisement service provider, such as for instance ADSP 104, wishes to reserve the advertising enabled game, the ADSP 104 optionally specifies a date range, in which case advertising broker site 108 queries a game inventory 112 to determine if any spots are available, either as part of an unreserved or wholesaled game. Additionally, any reach information for the spots optionally is displayed. Of course, any spots that have not been enabled are not revealed to ADSP 104. Alternatively, enabled and disabled spots are revealed providing advertisers an opportunity to entice game providers to open up more advertising spots. Furthermore, any spots that have been enabled, but are reserved by another ADSP such as for instance ADSP 106, are revealed to ADSP 104 but are clearly marked as unavailable. If spots that are marked as unavailable subsequently become available, then this change in status is reflected to the ADSP 104 the next time ADSP 104 reviews the data. Similarly, if additional spots become unavailable, then the change also is reflected to the ADSP 104 the next time ADSP 104 reviews the data.

If ADSP 104 subsequently leases the advertising enabled game, or reserves any wholesaled spots, then relevant information in the game inventory database 112, as well as spotted field information, is exposed to ADSP 104, such as the content associated with a spot, and its status, such as for instance not submitted, pending, needs modification, approved, declined, etc.

ADSP 104, now having unfilled advertising spots for advertising content, interacts with one or more advertisers. The graphical user interface is used to select content for available spots, and to preview the advertising content in context by appropriate texture mapping and transformation of the data overlaid on any provided screen shot. Optionally, images are edited to ensure that the color palettes match, etc. Finally, previews optionally are exported or sent for review by advertisers or other individuals or agencies associated with ADSP 104. Advantageously, the graphical user interface supports an overall ad management system that is WYSIWYG (what you see is what you get), and that is on-line and interactive. If the ADSP 104 and/or the advertiser are unhappy with the appearance of a selected content in a particular ad-spot, then this is immediately obvious at the selection stage since the graphical user interface is WYSIWYG. Dealing with such an issue at the selection stage avoids the costs associated with actually putting the ad into circulation, and then gauging its effectiveness based on gamer feedback, etc. In other words, the ADSP 104 and/or advertiser optionally preview a plurality of advertising content pieces at a same ad spot. The advertising content that has the best "fit" or "feel" at that particular ad spot then is selected, and other ad spots are investigated for the remaining advertising content. Optionally, multiple slots are assigned to a particular ad spot, such that a plurality of different advertising content is displayed over time using the same particular ad spot. Slots need not necessarily have identical duration, and the slot frequency may vary. Slot definition information relating to an itemized ad spot optionally is displayed within a separate frame or within a window of the graphical user interface.

Such an iterative approach to placing advertising content in a game helps to ensure that each specific piece of advertising content is displayed in a manner that is most effective for the advertiser. It also ensures that the final game product, including provided advertising content, retains the look and feel intended by the game provider 110. The process is highly interactive and is optionally performed on-line. In this way, optionally ADSP 104 signs on to a graphical user interface session from an office in Los Angeles, U.S.A. and an advertiser signs on to the same graphical user interface from an office in Paris, France. Changes made from the office in Los Angeles are reflected at the office in Paris, as though the Paris staff is looking over the shoulder of the Los Angeles staff. At any time, one or the other of the Los Angeles staff and the Paris staff have the option of signing off, allowing the other party to continue working. Similarly, if an outside opinion is required, then others may sign into the current session so as to be able to make changes and provide additional input.

Ultimately, content that is satisfactory to ADSP 104 is submitted to game provider 110 for approval. Optionally, other entities are involved in the game provider approval process, or have a separate approval process of their own. If ADSP 104 stores content, then submission of the content for approval comprises providing a reference to a publicly visible data server or alternatively to a secure server. For instance, ADSP 104 sends an e-mail message containing a link allowing the approving party to see, for approval purposes, a screenshot including the proposed advertising content placed into the ad spot. If advertising broker site 108 stores content, then submission of the content for approval comprises uploading the content to advertising broker site 108, whereupon the content is stored in a visible database. For instance, advertising broker site 108 sends an e-mail message containing a link allowing the approving party to see, for approval purposes, a screenshot including the proposed advertising content placed into the ad spot. Either way, the user interface used by both ADSP 104 and game provider 110 accesses the content in the same manner. If game provider 110 stores content, then advertising broker site 108 transfers the content from initial storage by ADSP 104 to game provider 110, and the graphical user interface retrieves the content from local storage. Submitted but not approved content optionally is stored by one of ADSP 104, advertising broker site 108, or game provider 110.

When content is submitted, game provider 110 is made aware of the fact the next time the data is reviewed. Alternatively, the game provider 110 is automatically pro-actively notified by advertising broker site 108. As described supra the game provider 110 uses the graphical user interface to preview the submitted content in a manner similar to that carried out by ADSP 104 and/or the advertiser. Individual spots are approved, rejected, or marked for modification. A report of any changes associated with the approval process is relayed back to ADSP 104 for subsequent action. Optionally, ADSP 104 and game provider 110 enter into an interface session and discuss changes in an on-line and interactive fashion. Optionally, approval is granted at the end of the session, or the modified content is submitted for consideration by a more formal approval process.

When game provider 110 approves content using the graphical user interface, advertising broker site 108 is notified. Advertising broker site 108 then secures the approved content, retrieves and applies any keys or certificates required to authenticate the secured content, and transfers the secured content to ADSP 104 for storage in a media database associated therewith, which is accessed by gaming site 102 during a game session. Optionally, securing of the approved content is performed by each approving party such that the approved content is tamper proof and such that the approvals are verifiable Optionally, reports are generated within the graphical user interface to indicate to ADSP 104 the overall status of the lease. For instance, a report is generated indicating four spots submitted and approved, two spots submitted and awaiting modification, and one spot not yet submitted.

Figure 2:
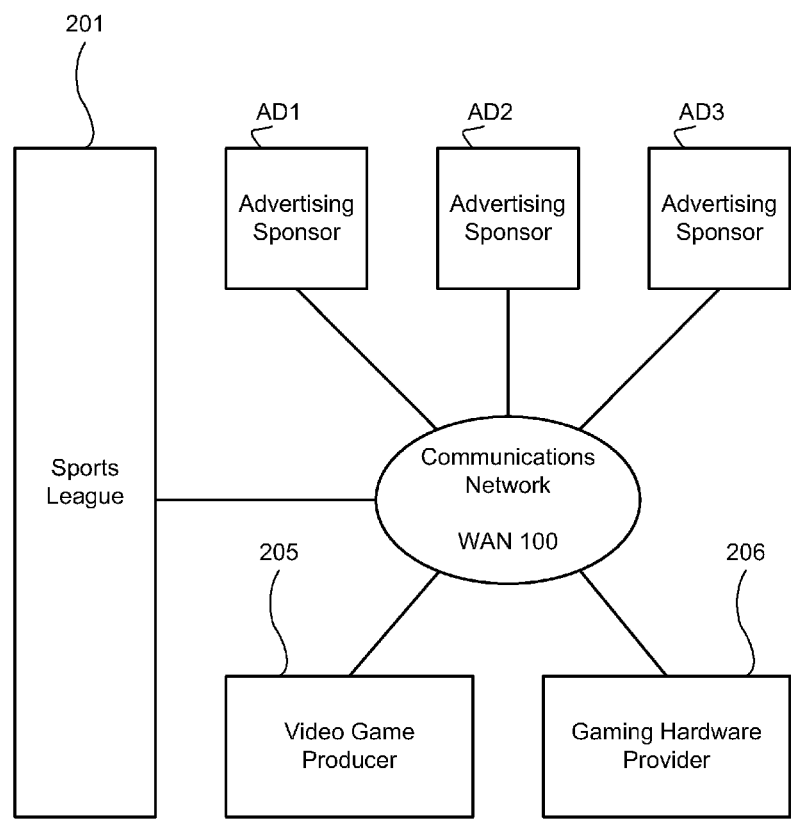
FIG. 2 is a simplified approval chart.

Referring to FIG. 2, shown is a simplified approval diagram for advertising content for insertion within a video game. Here the video game is of licensed content, the licensed content licensed from a sports league 201. As such, the sports league 201 has a right to approve of or disapprove of any content. Further, the advertising sponsors AD1, AD2, and AD3 of the sports league 201 have a right to veto any advertisement, which the sport league 201 can over rule should they see fit.

Because the product is a video game, a video game producer 205 has a right to approve or disapprove of content inserted therein. Finally, because the video game is implemented for a gaming console, the gaming hardware provider 206 in the form of a console manufacturer has a right to approve or disapprove of any content provided within the video game. Thus, a network of potential approval is formed.

Rewriting the approval rules in a Boolean expression results in the following rule:
Game console provider AND Game Publisher AND ((Licensor AND AD1 AND AD2 AND AD3) OR (Licensor AND Overrule))
This Boolean expression defines a set of rules for determining whether to show an advertisement from a video game advertising spot. Unfortunately, gathering each approval is time consuming and difficult and data entry errors will result in unapproved content being displayed.

Figure 3:
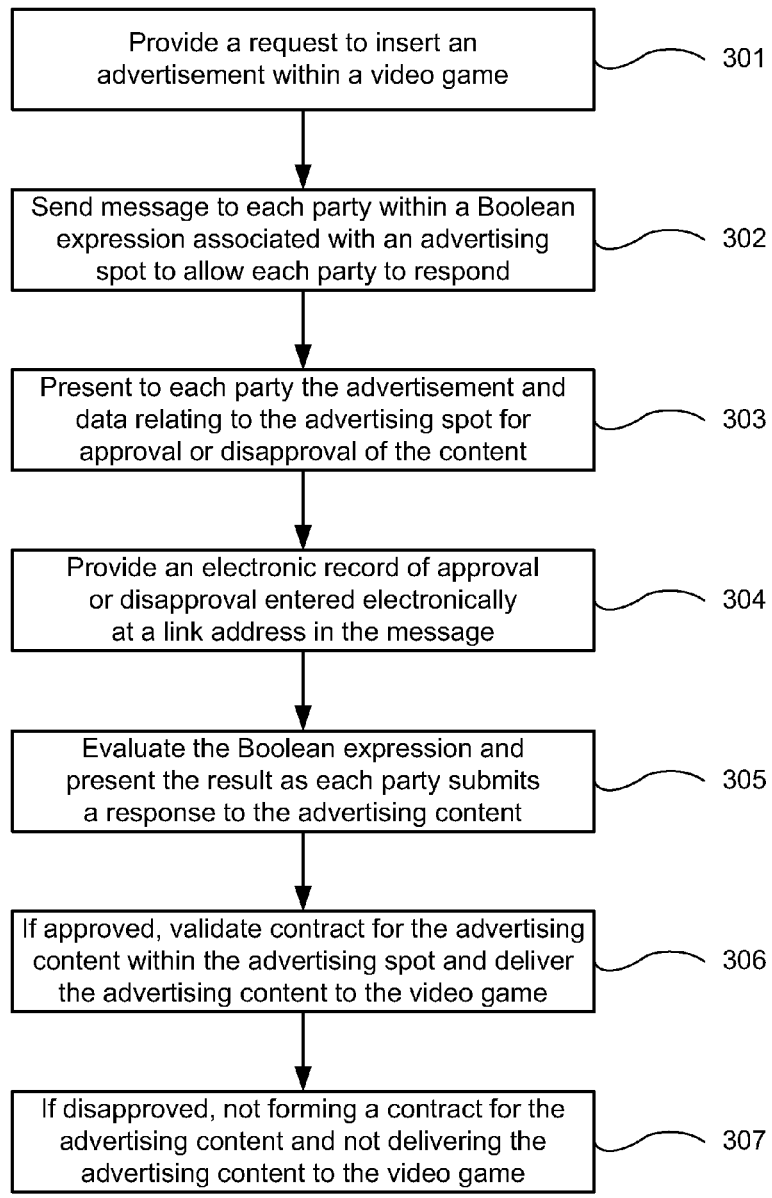
FIG. 3 is a simplified flow diagram of a method of approving advertising content prior to impressing advertisements based on the advertising content from within a video game.

Referring to FIG. 3, a simplified flow diagram of a method is shown. Here an advertisement is designed and a request to insert the advertisement within a video game is provided at 301. The advertisement is inserted within the video game in a location within a virtual world of the video game. The location is referred to herein as an advertising spot (Ad spot). An advertiser provides an advertisement for insertion within an advertising spot and requests an advertising contract. Terms such as reach and frequency and cost are determined in accordance with typical industry standards. Alternatively, they are determined in another fashion.

Once the advertising spot is requested, a Boolean expression associated with the advertising spot and relating to approval is reviewed and a message is sent to each party within the Boolean expression in order to allow each to respond at 302. The message provides a link to process for approving of the advertising content. Upon receiving a message, each approving party selects the link and is presented with the advertisement and data relating to the advertising spot in order to approve or disapprove of the content at 303. The approval or disapproval is entered electronically at the link address providing an electronic record of the approval at 304. Further, data entry errors of an organization only affect that organization and, as such, each organization retains and maintains responsibility for its own internal approval process.

As each party submits a response to the advertising content, the Boolean expression is evaluated and a result is presented at 305. When the result is that the advertising content is approved, then the contract for the advertising content within the advertising spot is validated and the advertising content is dynamically delivered to video games at 306. Alternatively, when the advertising content is other than approved, the contract is not formed and the advertising content is not delivered to the video games at 307.

Of course, when a WYSIWYG graphical user interface is available, the link presents the advertising content in context for approval or disapproval. This further allows individuals within organizations having approval rights to get second opinions from colleagues by merely showing them the screen as opposed to having to try to explain to them the scene and the advertisement and how it will fit together.

Figure 4:
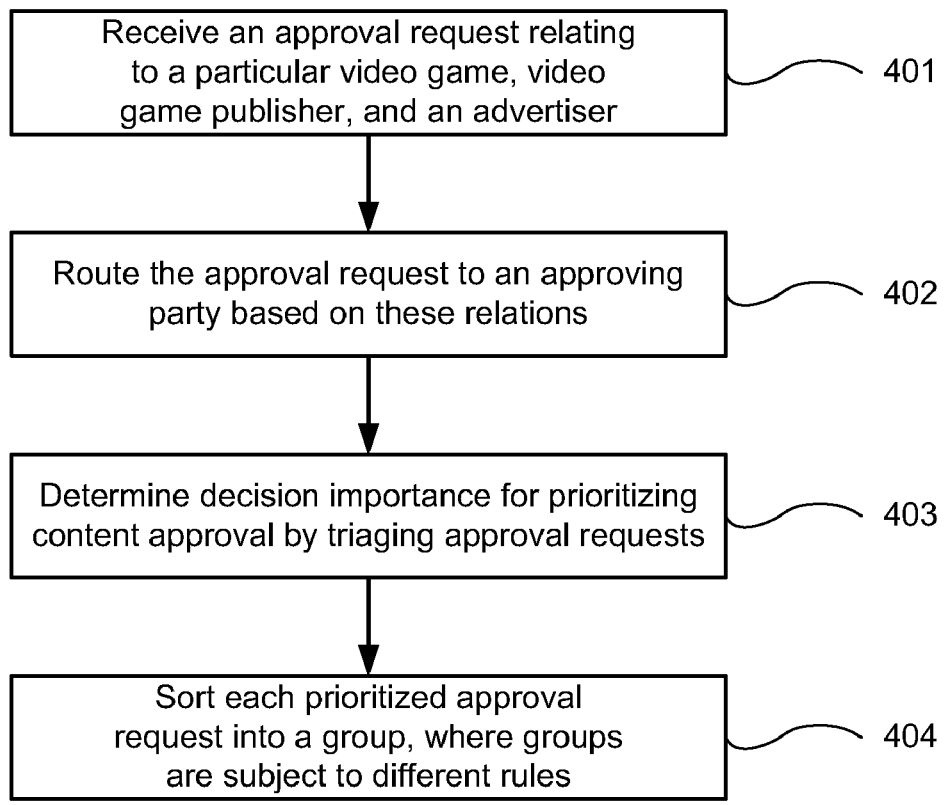
FIG. 4 is a simplified flow diagram of a method of automatically routing and filtering of advertising content approval requests.

Due to a number of potential approval requests that a single approver receives, for example a game console manufacturer may receive thousands of approval requests a month, it would be beneficial to streamline the approval process further. Referring to FIG. 4, shown is a simplified flow diagram of a rule based automated approval process. Here, an approval request is received relating to a particular video game, video game publisher and a particular advertiser at 401. Based on these relations, the approval request is routed to an approving party 402. Here, the requests are triaged such that decision importance is determined for prioritizing content approval at 403. For example, video games that are premium titles from a perspective of the approver are given highest priority. Further, publishers that are most important are given highest priority, and so forth. Also, advertisers with whom a close relationship exists are optionally given a higher priority or directed to individuals for managing special advertiser relations.

Once prioritized, each request is sorted into groups each subject to different rules at 404. The method will be described with reference to three groups though any number of groups is supported. Here a first group includes all premium games and premium publishers, a third group comprises all games more than twelve months old and all low end publishers, and second group comprises those video games that are not within the first and third groups. For the first group, a stringent set of rules is applied to force proper approval processing. Here, if approval or disapproval is not indicated within one business day, the matter is escalated to a manager and so forth. For very important publishers and content, immediate and useful feedback is expected. For the second group, escalation does not occur for seven days. Further, when escalated, the approval request is transferred to a committee for approval at a weekly meeting. The third group is automatically approved after seven days if there is no data input to the contrary.

Thus, an advertisement approval request is received at 402 from a very important publisher. The request is immediately processed and either approved, disapproved, or disapproved with reasons is provided in response to the request. If within one business day no response is provided, an approval manager is provided with the request to address same forthwith.

Another advertisement approval request is received at 402 that falls within the third group. The request is immediately looked at and seems fine. The approver need not do anything since the advertising content will be approved at the end of seven days automatically. Alternatively the approver responds. Further alternatively, the approver moves the approval request to a special folder of problems needing special attention and, in this fashion, avoids the seven day deadline.

Another advertisement approval request is received at 402 that falls within the second group. The request is scheduled to be reviewed within the next seven days. The approver looks at the advertisement request to determine a response at the scheduled time and chooses to approve the content or disapprove of the content with or without comments. Further alternatively, the approver moves the approval request to a special folder of problems needing special attention and, in this fashion, avoids the seven day deadline.

Alternatively, some of groups have approval rules built in. For example, a game console provider chooses to approve all content approved by a major video game publisher thereby offloading much of the approval work. When an approval request is received relating to a video game from a major publisher, the request is automatically approved. Similarly, approval requests from certain advertisers are automatically disapproved. For example, a publisher chooses not to approve advertising content from a competitor. Of course, more complex filters are also supported.

Advantageously, each approving party provides their own filters and their own approval and, as such, any data entry errors are a responsibility of the affected party. This facilitates approval reliability and limits finger pointing when "non-approved" content is impressed upon gamers while playing a video game.

Figure 5:
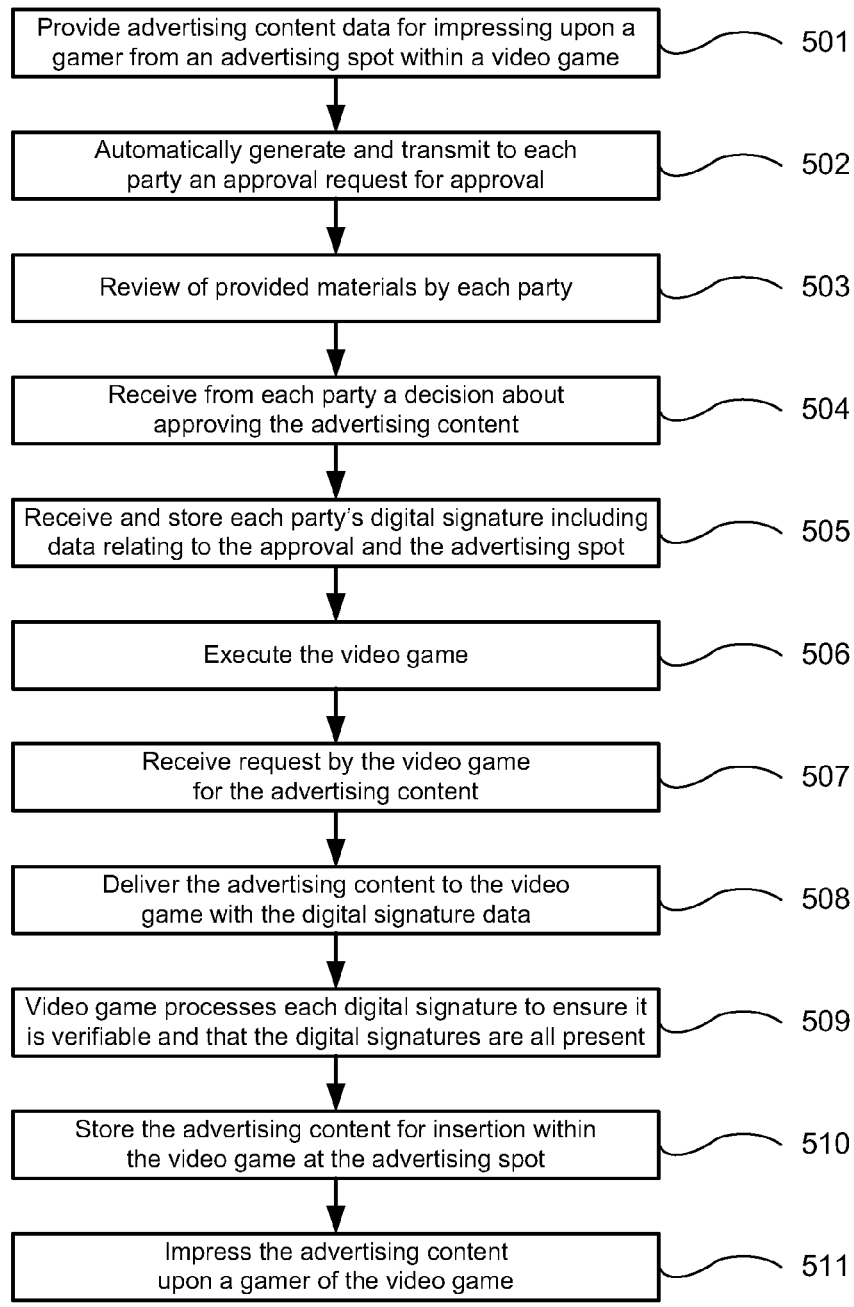
FIG. 5 shows a simplified flow diagram of a method of approving of advertising content using data security wherein the video game in execution validates the approvals.

Referring to FIG. 5 shown is a simplified flow diagram of a method of approving of advertising content using data security wherein the video game in execution validates advertising content approvals. At 501, an advertisement provider provides advertising content data for impressing upon a gamer from an advertising spot within a video game. An approval request is automatically generated and transmitted to each party for approval 502. Each approving party reviews the material provided, for example by visiting a location on a network and makes a decision about approving, disapproving, approving with conditions, disapproving with comments 503. For this example, each party approves the advertising content at 504. The approving parties include the game provider, the game hardware provider in the form of the console provider, and the advertising broker. Once each party has indicated that the content is approved, it is digitally signed by each party and a digital signature is stored therewith. The digital signature includes data relating to the approval including an approving individual, a data, a time, any conditions for the approval, the advertisement, and data relating to the advertising spot at 505. Conditions include a time frame for the advertisement approval—a length of time the advertisement is approved for.

At 506, the video game is executed. Advertising content is requested by the video game at 507 and the advertising content is delivered thereto with the digital signature data at 508. The video game is programmed with appropriate approval requirements for the video game. As this is a matter for the video game producer to decide based on contractual and other relationships, it is appropriate that the game should verify each approval. At 509, the video game processes each digital signature to ensure that they are verifiable and that the digital signatures are all present. Once each digital signature is verified and the content is checked for tampering—this is also achievable through verification of digital signatures—the content is retrievably stored for insertion within the video game at the advertising spot at 510 and for being impressed upon a gamer of the video game at 511.

As a result of the above process, an advertisement is only impressed upon a gamer from within a video game when (a) all approvals are correctly provided and verifiable, (b) when some approvals are incorrectly provided through an error of the approving party, (c) when the video game has an error in its programming allowing unapproved content to be used, or (d) when a security key of one of the parties involved has been compromised. Clearly, (a) is desirable, (b) and (d) are within control of the approving parties and (c) is within the control and responsibility of the game provider. As such, an automated and trackable approval process is presented that shifts responsibility for errors onto appropriate parties and limits data entry errors from affecting relationships between the parties involved.

Figure 6:
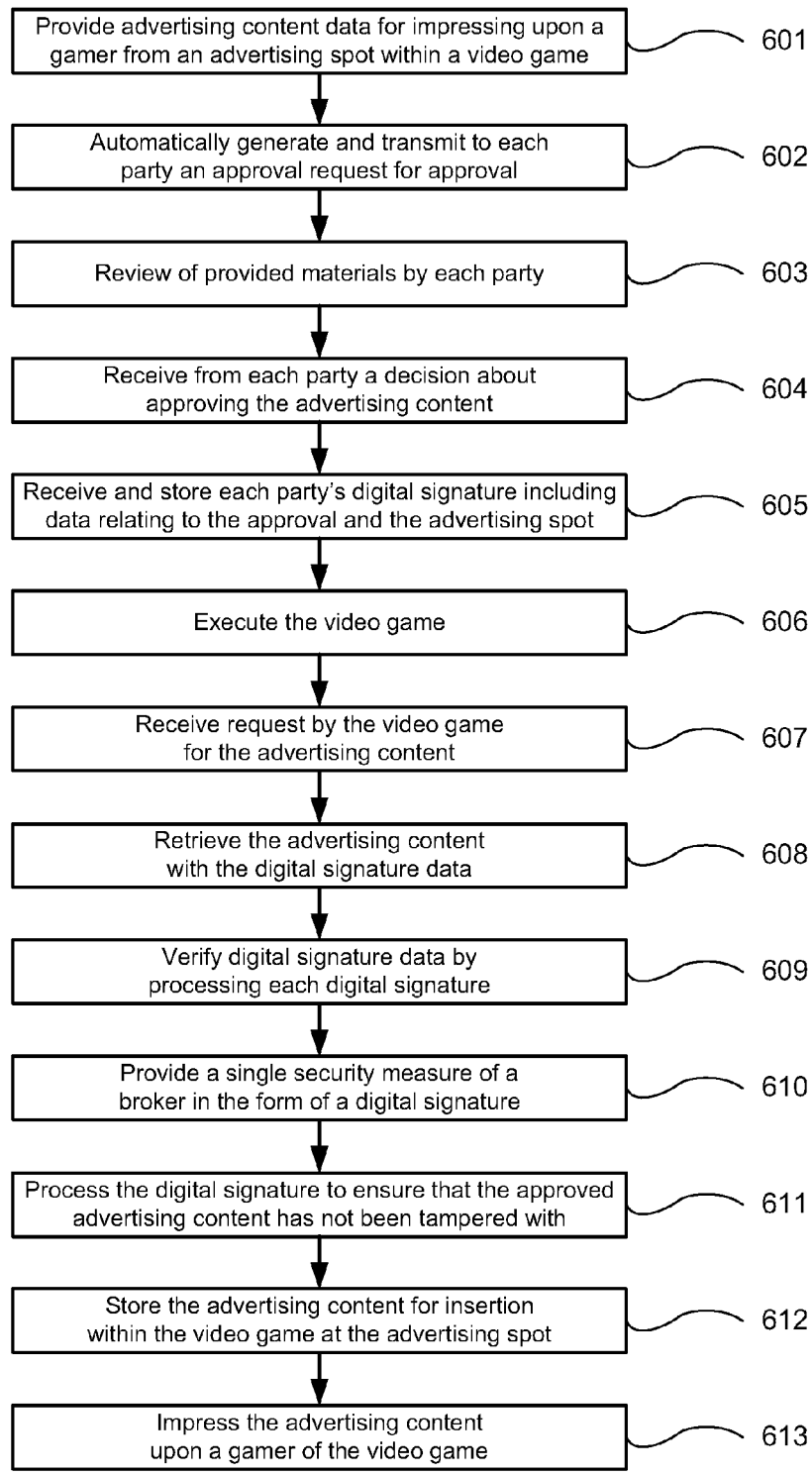
FIG. 6 shows a simplified flow diagram of a method of approving of advertising content using data security wherein the broker validates the approvals.

Referring to FIG. 6 shown is a simplified flow diagram of a method of approving of advertising content using data security wherein the broker validates the approvals. At 601, an advertisement provider provides advertising content data for impressing upon a gamer from an advertising spot within a video game. An approval request is automatically generated and transmitted to each party for approval 602. Each approving party reviews the material provided, for example by visiting a location on a network and makes a decision about approving, disapproving, approving with conditions, disapproving with comments 603. For this example, each party approves the advertising content at 604. The approving parties include the game provider, the game hardware provider in the form of the console provider, and the advertising broker. Once each party has indicated that the content is approved, it is digitally signed by each party and a digital signature is stored therewith. The digital signature includes data relating to the approval including an approving individual, a data, a time, any conditions for the approval, the advertisement, and data relating to the advertising spot at 605. Conditions include a time frame for the advertisement approval—a length of time the advertisement is approved for.

At 606, the video game is executed. Advertising content is requested by the video game at 607 and the advertising content is retrieved by the broker with the digital signature data at 608. The digital signature data is verified at 609 by processing of each. Once each digital signature is verified and the content is verified for tampering and appropriateness for delivery to the video game, the advertising content, associated conditions, and a single security measure of the broker in the form of a digital signature is provided at 610. The video game is programmed with appropriate approval requirements for the video game. As this is a matter for the video game producer to decide based on contractual and other relationships, it is appropriate that the game should verify each approval. At 611, the video game processes the digital signature to ensure it indicates approved content that is other than tampered with. Once verified and the content is checked for tampering, the content is retrievably stored for insertion within the video game at the advertising spot at 612 and for being impressed upon a gamer of the video game at 613.

As a result of the above process, an advertisement is only impressed upon a gamer from within a video game when (a) all approvals are correctly provided and verifiable, (b) when some approvals are incorrectly provided through an error of the approving party, (c) when the broker has an error in its programming allowing unapproved content to be used, or (d) when a security key of one of the parties involved has been compromised. Clearly, (a) is desirable, (d) is within control of the approving parties, (c) is within the control and responsibility of the broker, and (b) provides an advantage by offloading of approval processing from the video game processor at an expense of a video game provider entering data relating to the approval process into a broker database. As such, an automated and trackable approval process is presented that shifts responsibility for errors onto appropriate parties and limits data entry errors from affecting relationships between the parties involved.

Figure 7:
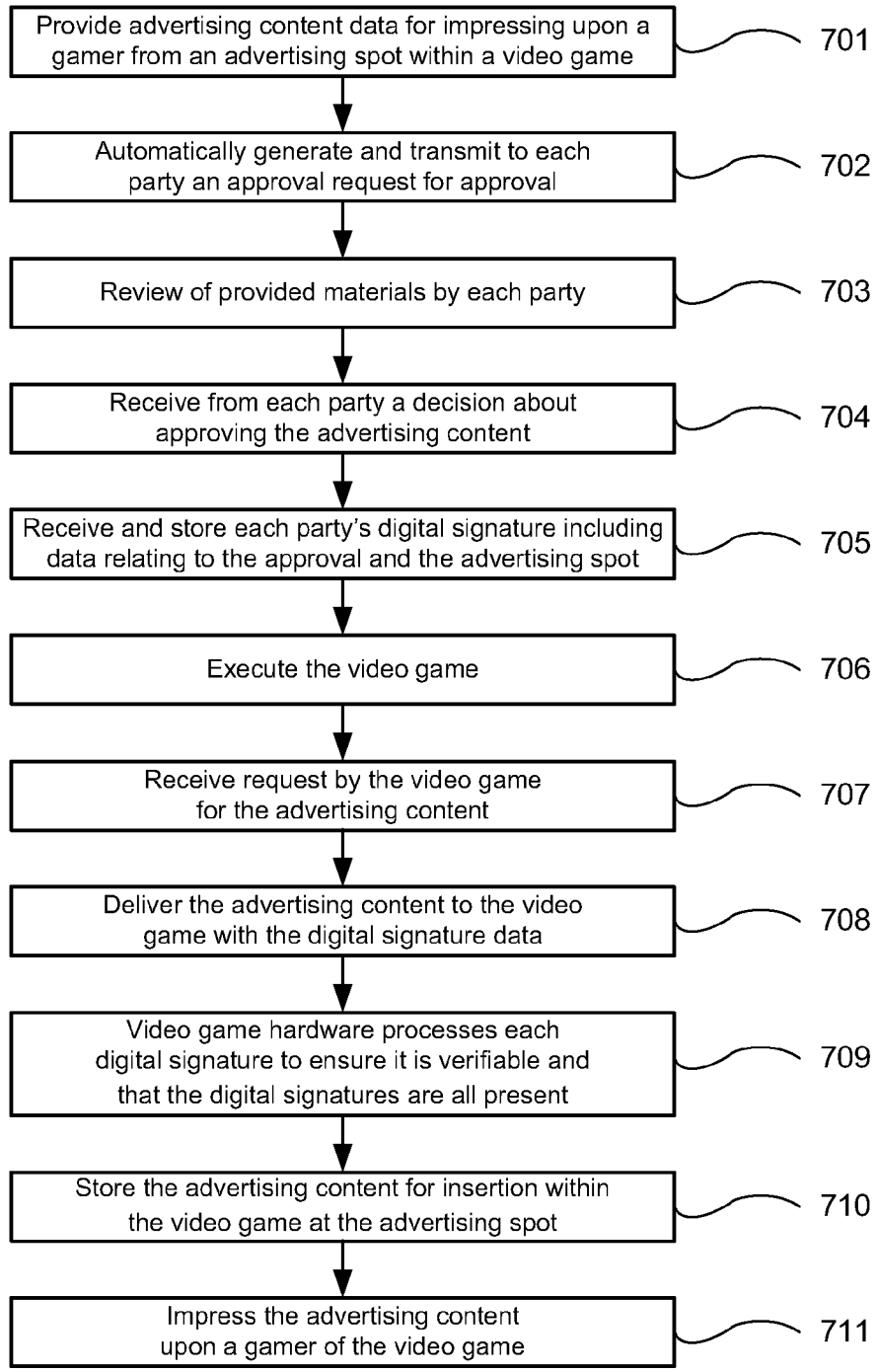
FIG. 7 shows a simplified flow diagram of a method of approving of advertising content using data security wherein the video game hardware executes a process for validating the approvals.

Referring to FIG. 7 shown is a simplified flow diagram of a method of approving of advertising content using data security wherein the video game hardware executes a process for validating the approvals. At 701, an advertisement provider provides advertising content data for impressing upon a gamer from an advertising spot within a video game. An approval request is automatically generated and transmitted to each party for approval 702. Each approving party reviews the material provided, for example by visiting a location on a network and makes a decision about approving, disapproving, approving with conditions, disapproving with comments 703. For this example, each party approves the advertising content at 704. The approving parties include the game provider, the game hardware provider in the form of the console provider, and the advertising broker. Once each party has indicated that the content is approved, it is digitally signed by each party and a digital signature is stored therewith. The digital signature includes data relating to the approval including an approving individual, a data, a time, any conditions for the approval, the advertisement, and data relating to the advertising spot at 705. Conditions include a time frame for the advertisement approval—a length of time the advertisement is approved for.

At 706, the video game is executed. Advertising content is requested by the video game at 707 and the advertising content is delivered thereto with the digital signature data at 708. The video game is programmed with appropriate approval requirements for the video game and provides these as parameters to the video game processor along with the advertising content data and approval data for processing thereof. At 709, the video game processor hardware processes each digital signature to ensure that they are verifiable and that the digital signatures are all present. Once each digital signature is verified and the content is checked for tampering—this is also achievable through verification of digital signatures—the content is retrievably stored for insertion within the video game at the advertising spot at 710 and for being impressed upon a gamer of the video game at 711.

As a result of the above process, advertising content is verified by a video game hardware manufacturer ensuring ubiquity in approaches to advertising content security.

Figure 8:
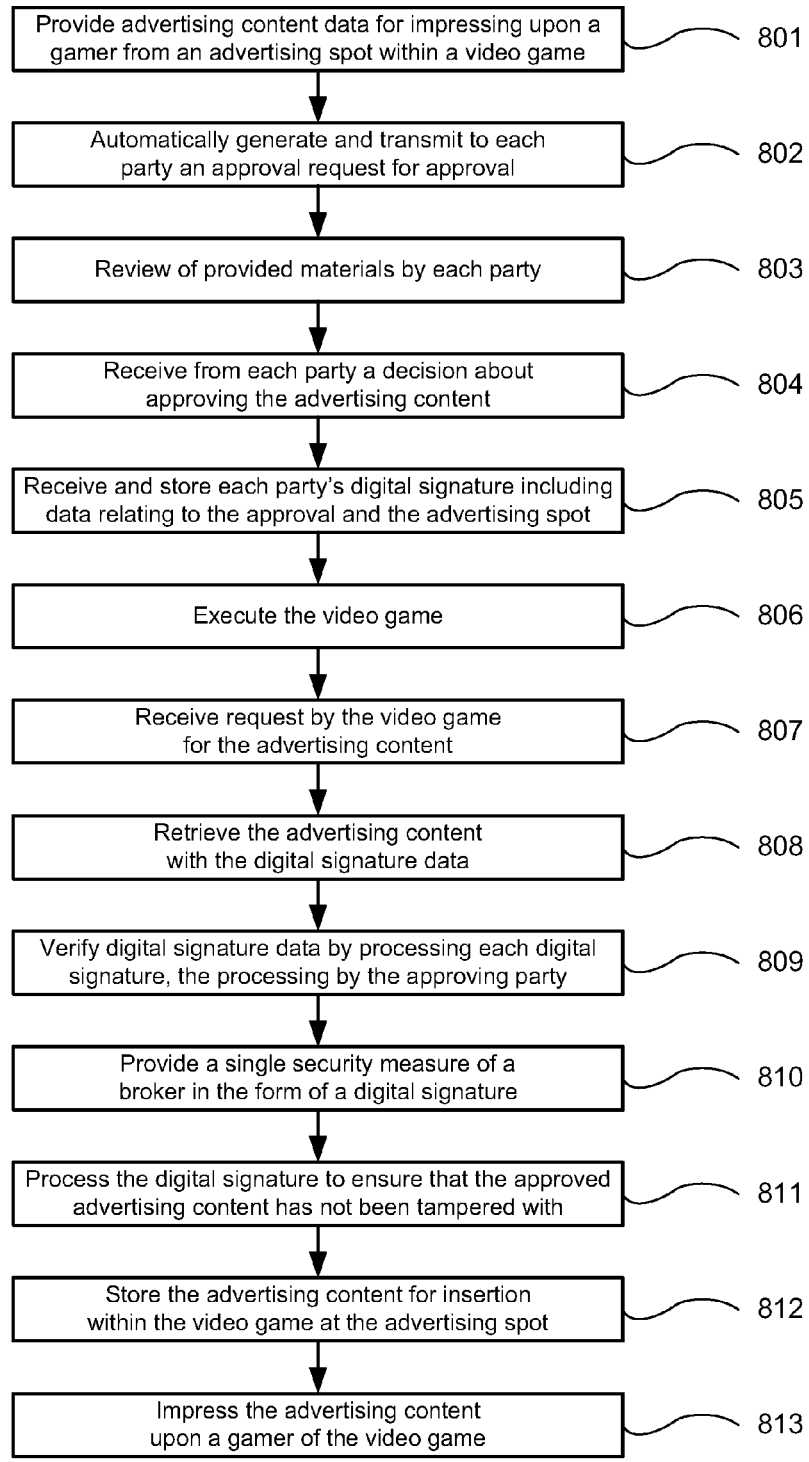
FIG. 8 shows a simplified flow diagram of a method of approving of advertising content using data security wherein each approving party validates their approvals; and, FIG. 9 shows a simplified flow diagram of a method of digitally signing advertising content.

Referring to FIG. 8 shown is a simplified flow diagram of a method of approving of advertising content using data security wherein each approving party validates their approvals. At 801, an advertisement provider provides advertising content data for impressing upon a gamer from an advertising spot within a video game. An approval request is automatically generated and transmitted to each party for approval 802. Each approving party reviews the material provided, for example by visiting a location on a network and makes a decision about approving, disapproving, approving with conditions, disapproving with comments 803. For this example, each party approves the advertising content at 804. The approving parties include the game provider, the game hardware provider in the form of the console provider, and the advertising broker. Once each party has indicated that the content is approved, it is digitally signed by each party and a digital signature is stored therewith. The digital signature includes data relating to the approval including an approving individual, a data, a time, any conditions for the approval, the advertisement, and data relating to the advertising spot at 805. Conditions include a time frame for the advertisement approval—a length of time the advertisement is approved for.

At 806, the video game is executed. Advertising content is requested by the video game at 807 and the advertising content is retrieved by the broker with the digital signature data at 808. The digital signature data is verified at 809 by processing of each digital signature by its originator. Once processed and verified and the advertising content is trusted, the advertising content, associated conditions, and a single security measure of the broker in the form of a digital signature is provided at 810. The video game is programmed with appropriate approval requirements for the video game. As this is a matter for the video game producer to decide based on contractual and other relationships, it is appropriate that the game should verify each approval. At 811, the video game processes the digital signature to ensure it indicates approved content that is other than tampered with. Once verified and the content is checked for tampering, the content is retrievably stored for insertion within the video game at the advertising spot at 812 and for being impressed upon a gamer of the video game at 813.

Though the embodiment is described with reference to a parallel approval validation process, it is equally applicable to a serial approval validation process wherein each party verifies the approval one at a time. This avoids additional effort when an early approval validation process fails at an expense of additional latency. Alternatively, a combination of serial and parallel approvals is undertaken.

Though the above embodiments relate to a use of digital signatures, other tamper protection methods are also applicable.

Further, when a single trusted party exists, optionally only a single digital signature is included with the advertising content, the other digital signatures verified and stored in a database for trackability prior to generation and inclusion of the single digital signature. Preferably, the single trusted party is one of the game provider and the broker.

Figure 9:
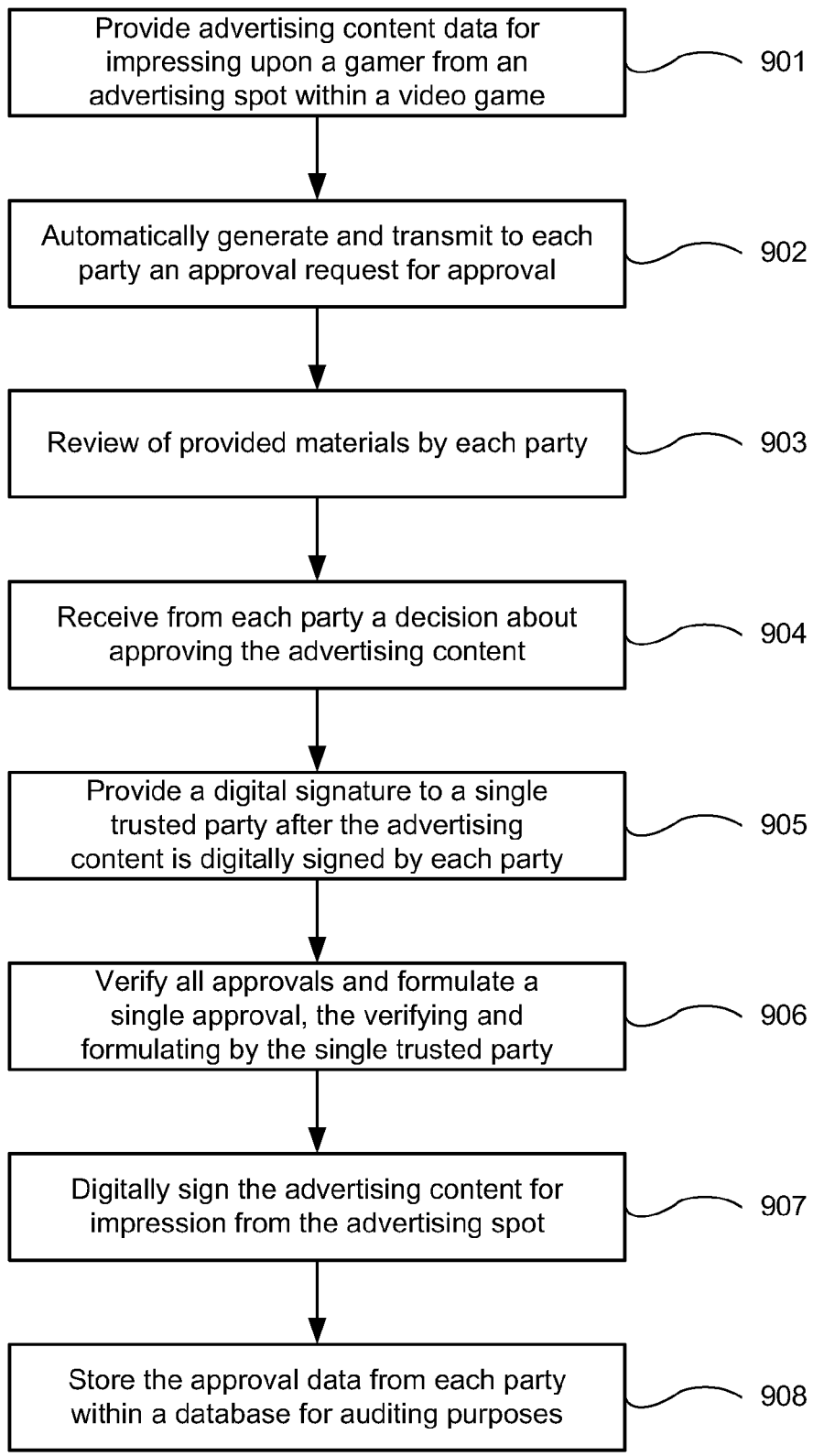

Referring to FIG. 9, a method of digitally signing advertising content is presented wherein a single trusted party in the form of the game provider coordinates the approval process. Though the process is described as automated more manual implantations are also supported.

At 901, an advertisement provider provides advertising content data for impressing upon a gamer from an advertising spot within a video game. An approval request is automatically generated and transmitted to each party for approval 902. Each approving party reviews the material provided, for example by visiting a location on a network and makes a decision about approving, disapproving, approving with conditions, disapproving with comments 903. For this example, each party approves the advertising content at 904. The approving parties include the game provider, the game hardware provider in the form of the console provider, and the advertising broker. Once each party has indicated that the content is approved, it is digitally signed by each party and a digital signature is provided to the single trusted party at 905. At 906, the single trusted party verifies all approvals and formulates a single approval based thereon, digitally signing the advertising content for impression from the advertising spot at 907. At 908, the approval data from each approving party is stored within a database for auditing purposes.

Once the advertising content is delivered to a video game, the video game verifies the security to ensure that tampering has been prevented and that the advertising content is approved by the single trusted party and then stores the advertising content within memory for retrieval and impressing upon a gamer during video game play.

Alternatively, the single trusted party comprises the advertising broker.

Alternatively, a broker validates advertising content and then provides same to an advertising server remote from the broker for being retrievably stored therein. During execution, a video game retrieves the validated advertising content from the advertising server either directly or through a broker mediated process. Thus, validation of advertising content approval and of the content itself is performable either within a server for serving of advertising content or by another server. Further alternatively, the validation is performed by a separate validation server.

Though the above embodiments address requesting and granting approval from all approval parties in parallel, there are times when approval processes initiated in series are highly advantageous. For example, this prevents annoying approval requests when all parties are likely to disapprove of similar content. Thus, for example, a game publisher is provided advertising content approval requests first and only once they have approved of the content is it provided to each other party for approval. In this way, the approval process is rendered more efficient in many instances even though it typically results in more calendar elapsing time to complete a straight forward approval process.

Though the above embodiments address requesting and granting approval. Optionally, approval is granted with restrictions. For example, advertising content is granted approval in Europe but disapproved of for North America. Alternatively, advertising content is granted approval based on time of impression. For example, some advertising content is only approved for display after 11:00 PM to avoid impressing same on younger gamers. Approval conditions depend on advertising server features and an ability to gather data for implementing the rules.

Though the above embodiments address requesting and granting approval. Once granted, approval is revocable. When an approval is revoked, the advertising content is subjected to the Boolean process to determine whether it remains approved content. When the advertising content is no longer approved content, a message is provided to the video game having the ad spot therein to cancel impressing of the advertising content on gamers of the video game. Further, provision of the advertising content for display within the ad spot is discontinued.

Numerous other embodiments may be envisaged without departing from the spirit or scope of the invention.

What is claimed is:

1. A computer-implemented method, comprising:
providing, a catalog of advertising spots available for use in an ad campaign, each of the available advertising spots being associated with multiple parties having content approval authority for the advertising spot, wherein the multiple parties are selected from the following group: an advertisement service provider, an advertising broker, a game publisher or a game developer provider of a video game;
receiving, at a computer processor, reservation requests for advertising spots provided in the catalog, each reservation request specifying particular advertising content for insertion at the respective requested advertising spot;
for each reservation request for each advertising spot:
upon receiving the reservation request, determining, by a computer processor, an approval combination required for enabling insertion of the particular advertising content at the requested advertising spot during execution of a video game, the approval combination specifying the multiple parties that have content approval authority for the requested advertising spot;
transmitting a message to each of the multiple parties in the approval combination, the message requesting approval of the particular advertising content for insertion at the requested advertising spot within the video game;
receiving replies to the messages from the multiple parties, wherein a reply indicates a respective one of the multiple parties approval or disapproval of the reservation request; and
determining, by the computer processor, that the reservation request is approved after receipt of the replies and in response to a determination that each of the multiple parties specified by the approval combination has approved the reservation request, wherein the approval of the reservation request specifies that the advertising content is approved to be inserted at the requested advertising spot for presentation to a plurality of users playing the video game; wherein transmitting a message to each of the multiple parties in the approval combination comprises: transmitting a first message requesting approval to a first one of the multiple parties; and transmitting a second message requesting approval to a second one of the multiple parties only after a reply from the first one of the multiple parties to the first message is received approving the reservation request by the first one of the multiple parties.

2. A method according to claim 1 wherein the multiple parties include the advertisement service provider, the advertising broker, and the game publisher.

3. A method according to claim 2, further comprising:
receiving from each of the multiple parties secured data related to the particular advertising content for indicating the party's respective approval or disapproval of the particular advertising content.

4. A method according to claim 3 wherein the secured data from each of the multiple parties comprises a digital signature of the party.

5. A method according to claim 3, further comprising:
determining that the reservation request is approved by evaluating each of the secured data according to a Boolean expression of the required approval combination.

6. A method according to claim 1 wherein the message comprises one of a multimedia representation of the particular advertising content within the requested advertising spot and a link to a multimedia representation of the particular advertising content within the requested advertising spot.

7. A method according to claim 6 wherein the message provides an opportunity to approve or disapprove the advertising content.

8. A method according to claim 7 wherein the opportunity to approve comprises an opportunity to approve with restrictions.

9. A method according to claim 8 wherein the restrictions include at least one of temporal restrictions, frequency restrictions, or geographic location based restrictions.

10. A method according to claim 9 wherein the restrictions comprise temporal restrictions specifying a time of day during which the advertising content is not displayed.

11. A method according to claim 9 wherein the restrictions comprise geographic location based restrictions specifying a geographic location wherein the advertising content is not displayed.

12. A method according to claim 7 wherein the opportunity to disapprove comprises an opportunity to disapprove with comments.

13. A method according to claim 1, wherein:
the message includes information about one or more parties associated with the advertising content, and is automatically placed within one of a plurality of groups at an approving party based on the information and one or more filtering criteria specified by the approving party.

14. A method according to claim 13 wherein:
messages within at least one of the plurality of groups receives automatic approvals after a predetermined period of time.

15. A method according to claim 13 wherein messages within each of the plurality of groups is subject to a different internal approval process of the approving party.

16. A method according to claim 1, further comprising:
receiving an approval in one of the replies, the approval having been generated at by approving party automatically after a predetermined period of time.

17. A method according to claim 16, further comprising:
when the reservation request is approved, securing the advertising content for delivery to the video game; and
storing the secured advertising content within an advertising server for delivery to the video game therefrom.

18. A method according to claim 17 wherein the replies are received by one of the advertising broker or the game publisher.

19. A method according to claim 1 wherein transmitting a message to each of the multiple parties in the approval combination comprises:
transmitting a first message requesting approval to a first one of the multiple parties; and
transmitting a second message requesting approval to a second one of the multiple parties only after a reply from the first one of the multiple parties to the first message is received approving the reservation request by the first one of the multiple parties.

20. A method according to claim 17 wherein all of the messages are transmitted in parallel, and each message is transmitted without knowledge of whether a reply to another of the messages relating to a same advertising content and particular advertising spot has been received.

21. A method according to claim 17 wherein the advertising content is not provided for insertion into the video game prior to the reservation request being approved.

22. A method according to claim 21, further comprising:
receiving an indication from one of the multiple parties that content approval has been revoked for the advertising content within the particular advertising spot; and
communicating with the video game to indicate that approval for the advertising content within the particular advertising spot is revoked.

23. The method of claim 1, further comprising automatically approving or disapproving the insertion of the advertising content based on a presence or absence of a competitive conflict with an advertiser of the advertising content.

24. A system comprising: a processor; and
memory coupled to the processor, and including instructions, which, when executed by the processor, cause the processor to perform operations comprising:
providing a catalog of advertising spots available for use in an ad campaign, each of the available advertising spots being associated with multiple parties having content approval authority for the advertising spot, wherein the multiple parties are selected from the following group: an advertisement service provider, an advertising broker, a game publisher or a game developer provider of a video game;
receiving reservation requests for advertising spots provided in the catalog, each reservation request specifying particular advertising content for insertion at the respective requested advertising spot;
for each reservation request for each advertising spot:
upon receiving the reservation request, determining an approval combination required for enabling insertion of the particular advertising content at the requested advertising spot during execution of a video game, the approval combination specifying the multiple parties that have content approval authority for the requested advertising spot; and
transmitting a message to each of the multiple parties in the approval combination, the message requesting approval of the particular advertising content for insertion at the requested advertising spot within the video game;
receiving replies to the messages from the multiple parties, wherein a reply indicates a respective one of the multiple parties approval or disapproval of the reservation request; and
determining that the reservation request is approved after receipt of the replies and in response to a determination that each of the multiple parties specified by the approval combination has approved the reservation request, wherein the approval of the reservation request specifies that the advertising content is approved to be inserted at the requested advertising spot for presentation to a plurality of users playing the video game; wherein transmitting a message to each of the multiple parties in the approval combination comprises: transmitting a first message requesting approval to a first one of the multiple parties; and transmitting a second message requesting approval to a second one of the multiple parties only after a reply from the first one of the multiple parties to the first message is received approving the reservation request by the first one of the multiple parties.

25. A non-transitory computer-readable storage medium having instructions stored thereon, the instructions, when executed by a processor, cause the processor to perform operations comprising:
  providing a catalog of advertising spots available for use in an ad campaign, each of the available advertising spots being associated with multiple parties having content approval authority for the advertising spot, wherein the multiple parties are selected from the following group: an advertisement service provider, an advertising broker, a game publisher or a game developer of a video game;
  receiving reservation requests for advertising spots provided in the catalog, the each reservation request specifying particular advertising content for insertion at the respective requested advertising spot;
  for each reservation request for each advertising spot:
  upon receiving the reservation request, determining an approval combination required for enabling insertion of the particular advertising content at the requested advertising spot during execution of a video game, the required approval combination specifying the multiple parties that have content approval authority for the requested advertising spot; and transmitting a message to each of the multiple parties in the approval combination, the message requesting approval of the particular advertising content for insertion at the requested advertising spot within the video game;
  receiving replies to the messages from the multiple parties, wherein a reply indicates a respective one of the multiple parties approval or disapproval of the reservation request;
  and determining that the reservation request is approved after receipt of the replies and in response to a determination that each of the multiple parties specified by the approval combination has approved the reservation request, wherein the approval of the reservation request specifies that the advertising content is approved to be inserted at the requested advertising spot for presentation to a plurality of users playing the video game; wherein transmitting a message to each of the multiple parties in the approval combination comprises: transmitting a first message requesting approval to a first one of the multiple parties; and transmitting a second message requesting approval to a second one of the multiple parties only after a reply from the first one of the multiple parties to the first message is received approving the reservation request by the first one of the multiple parties.

26. The computer-readable storage medium according to claim 25 wherein the multiple parties include the game developer.

27. The computer-readable storage medium according to claim 26, wherein the operations further comprise:
  receiving from each of the multiple parties secured data related to the particular advertising content for indicating the party's respective approval or disapproval of the particular advertising content.

28. The computer-readable storage medium according to claim 27 wherein the secured data from each of the multiple parties comprises a digital signature of the party.

29. The computer-readable storage medium according to claim 27, wherein the operations further comprise:
  determining that the reservation request is approved by evaluating each of the secured data according to a Boolean expression of the required approval combination.

30. The computer-readable storage medium according to claim 25 wherein the message comprises one of a multimedia representation of the particular advertising content within the requested advertising spot and a link to a multimedia representation of the particular advertising content within the requested advertising spot.

31. The computer-readable storage medium according to claim 30 wherein the message provides an opportunity to approve or disapprove the advertising content.

32. The computer-readable storage medium according to claim 31 wherein the opportunity to approve comprises an opportunity to approve with restrictions.

33. The computer-readable storage medium according to claim 32 wherein the restrictions include at least one of temporal restrictions, frequency restrictions, or geographic location based restrictions.

34. The computer-readable storage medium according to claim 32 wherein the restrictions comprise temporal restrictions specifying a time of day during which the advertising content is not displayed.

35. The computer-readable storage medium according to claim 32 wherein the restrictions comprise geographic location based restrictions specifying a geographic location wherein the advertising content is not displayed.

36. The computer-readable storage medium according to claim 31 wherein the opportunity to disapprove comprises an opportunity to disapprove with comments.

37. The computer-readable storage medium according to claim 25, wherein:
  the message includes information about one or more parties associated with the advertising content, and is automatically placed within one of a plurality of groups at an approving party based on the information and one or more filtering criteria specified by the approving party.

38. The computer-readable storage medium according to claim 37 wherein:
  messages within at least one of the plurality of groups receives automatic approvals after a predetermined period of time.

39. The computer-readable storage medium according to claim 37 wherein messages within each of the plurality of groups is subject to a different internal approval process of the approving party.

40. The computer-readable storage medium according to claim 25, wherein the operations further comprise:
  receiving an approval in one of the replies, the approval having been generated at an approving party automatically after a predetermined period of time.

41. The computer-readable storage medium according to claim 40, wherein the operations further comprise:
  when the reservation request is approved, securing the advertising content for delivery to the video game; and storing the secured advertising content within an advertising server for delivery to the video game therefrom.

42. The computer-readable storage medium according to claim 41 wherein the replies are received by one of the advertising broker or the game publisher.

43. The computer-readable storage medium according to claim 41 wherein some of the messages are transmitted serially, and a reply from a first message is received before a second message is transmitted.

44. The computer-readable storage medium according to claim 41 wherein all of the messages are transmitted in parallel, and each message is transmitted without knowledge of whether a reply to another of the messages relating to a same advertising content and particular advertising spot has been received.

45. The computer-readable storage medium according to claim 41 wherein the advertising content is not provided for insertion into the video game prior to the reservation request being approved.

46. The computer-readable storage medium according to claim 45, wherein the operations further comprise:
   receiving an indication from one of the multiple parties that content approval has been revoked for the advertising content within the particular advertising spot; and
   communicating with the video game to indicate that approval for the advertising content within the particular advertising spot is revoked.

47. The computer-readable storage medium according to claim 25, wherein the operations further comprise automatically approving or disapproving the insertion of the advertising content based on a presence or absence of a competitive conflict with an advertiser of the advertising content.

* * * * *

UNITED STATES PATENT AND TRADEMARK OFFICE
CERTIFICATE OF CORRECTION

| | | Page 1 of 1 |
|---|---|---|
| PATENT NO. | : 8,128,493 B2 | |
| APPLICATION NO. | : 11/311124 | |
| DATED | : March 6, 2012 | |
| INVENTOR(S) | : Willis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this
Twenty-fourth Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,128,493 B2
APPLICATION NO. : 11/311124
DATED : March 6, 2012
INVENTOR(S) : Daniel Willis It is certified that error appears in the above-identified patent and that said Letters Patent is hereby corrected as shown below:

IN THE CLAIMS:

In Column 14, Line 28, Claim 1, delete "providing," and insert -- providing --, therefor.

In Column 14, Line 34, Claim 1, delete "publisher" and insert -- publisher, --, therefor.

In Column 14, Line 34, Claim 1, delete "developer provider" and insert -- developer --, therefor.

In Column 16, Lines 4-13, Claim 19, delete the following claim: "19. A method according to claim 1 wherein transmitting a message to each of the multiple parties in the approval combination comprises: transmitting a first message requesting approval to a first one of the multiple parties; and transmitting a second message requesting approval to a second one of the multiple parties only after a reply from the first one of the multiple parties to the first message is received approving the reservation request by the first one of the multiple parties."

In Column 16, Line 43, Claim 24, delete "publisher" and insert -- publisher, --, therefor.

In Column 16, Line 43, Claim 24, delete "developer provider" and insert -- developer --, therefor.

In Column 16, Line 56, Claim 24, delete "spot; and" and insert -- spot; --, therefor.

In Column 17, Line 24, Claim 25, delete "publisher" and insert -- publisher, --, therefor.

In Column 17, Line 27, Claim 25, delete "the each" and insert -- each --, therefor.

In Column 17, Line 37, Claim 25, delete "spot; and" and insert -- spot; --, therefor.

Signed and Sealed this
Ninth Day of October, 2012

David J. Kappos
*Director of the United States Patent and Trademark Office*